(12) United States Patent
Uehira

(10) Patent No.: US 8,442,724 B2
(45) Date of Patent: May 14, 2013

(54) PASSENGER PROTECTION SYSTEM

(75) Inventor: Tetsuya Uehira, Kariya (JP)

(73) Assignee: Denso Corporation, Kariya (JP)

( * ) Notice: Subject to any disclaimer, the term of this patent is extended or adjusted under 35 U.S.C. 154(b) by 485 days.

(21) Appl. No.: 12/661,384

(22) Filed: Mar. 16, 2010

(65) Prior Publication Data

US 2010/0241316 A1 Sep. 23, 2010

(30) Foreign Application Priority Data

Mar. 18, 2009 (JP) ................. 2009-066089

(51) Int. Cl.
*G06F 17/00* (2006.01)
(52) U.S. Cl.
USPC ........... 701/45; 701/29.7; 701/30.1; 701/30.3
(58) Field of Classification Search ................. 701/29.7, 701/30.1, 31.1, 31.7, 30.3, 30.8
See application file for complete search history.

(56) References Cited

U.S. PATENT DOCUMENTS

| | | |
|---|---|---|
| 5,372,411 A | 12/1994 | Gerstenmaier et al. |
| 2007/0000711 A1 | 1/2007 | Yamaguchi et al. |
| 2007/0208475 A1 * | 9/2007 | Shimizu ......................... 701/45 |
| 2007/0255999 A1 * | 11/2007 | Risse ............................ 714/766 |

FOREIGN PATENT DOCUMENTS

JP  09-213084  8/1997

* cited by examiner

*Primary Examiner* — James Trammell
*Assistant Examiner* — Jerrah Edwards
(74) *Attorney, Agent, or Firm* — Harness, Dickey & Pierce, PLC

(57) ABSTRACT

A passenger protection system includes: a sensor outputting a detection digital data corresponding to collision; a passenger protection device; and an ECU. The sensor outputs a bit sequence providing an important bit group. A memory stores the data and the sequence doubly for storing first and second detection digital data and first and second bit sequences. The ECU determines based on the first or second data whether it is necessary to protect the passenger when the first data is equal to the second data. When the first data is different from the second data, and the first sequence is equal to the second sequence, the ECU replaces the important bit group in the first or second data with the first or second sequence, and determines based on the first or second data after replacement.

6 Claims, 4 Drawing Sheets

PASSENGER PROTECTION SYSTEM

CROSS REFERENCE TO RELATED APPLICATION

This application is based on Japanese Patent Application No. 2009-66089 filed on Mar. 18, 2009, the disclosure of which is incorporated herein by reference.

FIELD OF THE INVENTION

The present invention relates to a passenger protection system.

BACKGROUND OF THE INVENTION

Conventionally, a passenger protection system includes a sensor for outputting a detection data corresponding to an amount of impact when an object collides with a vehicle, a passenger protection device for protecting a passenger of the vehicle from collision, and a ECU for controlling the passenger protection device. In the system, the ECU determines based on the detection data from the sensor whether it is necessary to protect the passenger from occurrence of the collision. When the ECU determines that it is necessary to protect the passenger from collision, the ECU controls the passenger protection device. This system is described in, for example, JP-A-2007-8392.

However, in the above case, bit fixation may occur at a specific bit in a memory medium in the ECU for storing the detection data received from the sensor. Thus, collision determination may be incorrect.

In view of the above difficulty, the present inventor has studied a system. Specifically, to reduce the possibility of failure of determination that it is necessary to protect the passenger from collision, as shown in FIG. 7, detection data 52 output from a sensor 51 is stored in two different portions 54, 55 in a ECU 53. Then, two data in the portions 54, 55 are compared with each other. When the two data are not the same, the system determines malfunction, and then, the system deletes the two data.

Thus, the system reduces the possibility of failure of determination. However, function of the passenger protection system for detecting collision to protect the passenger may be reduced.

SUMMARY OF THE INVENTION

In view of the above-described problem, it is an object of the present disclosure to provide a passenger protection system with high detection accuracy. Specifically, in the system, possibility of malfunction of determination of collision is reduced, and the system surely detects collision in order to protect a passenger from the collision.

According to an aspect of the present disclosure, a passenger protection system for a vehicle includes: a sensor for detecting an impact of collision when the vehicle collides with an object and for outputting a detection digital data corresponding to a magnitude of the impact; a passenger protection device for protecting a passenger from the collision; and an electric control unit for determining based on the detection digital data whether it is necessary to protect the passenger from the collision and for activating the passenger protection device when the electric control unit determines that it is necessary to protect the passenger from the collision. The sensor outputs a bit sequence together with the detection digital data to the electric control unit. The bit sequence includes a plurality of bits, which provide an important bit group. The important bit group is defined in such a manner that difference of the magnitude of the impact between a case where one bit of the detection digital data is "1" and a case where the one bit of the detection digital data is "0" is equal to or larger than a predetermined value. The detection digital data includes a plurality of bits for providing the important bit group. The electric control unit includes a memory. The memory stores the detection digital data doubly so that a first detection digital data and a second detection digital data are stored in the memory. The memory stores the bit sequence doubly so that a first bit sequence and a second bit sequence are stored in the memory. The electric control unit determines based on the first or second detection digital data whether it is necessary to protect the passenger from the collision when the first detection digital data is equal to the second detection digital data. When the first detection digital data is different from the second detection digital data, the electric control unit compares the first bit sequence with the second bit sequence. When the first detection digital data is different from the second detection digital data, and the first bit sequence is different from the second bit sequence, the electric control unit does not determine whether it is necessary to protect the passenger from the collision. When the first detection digital data is different from the second detection digital data, and the first bit sequence is equal to the second bit sequence, the electric control unit replaces the important bit group in the first or second detection digital data with the first or second bit sequence, and the electric control unit determines based on the first or second detection digital data after replacement whether it is necessary to protect the passenger from the collision.

In the above system, even if the first detection data is different from the second detection data, the system determines with using the modified first or second detection data whether it is necessary to protect the passenger from the collision. Thus, the system surely detects collision in order to protect a passenger from the collision. Further, possibility of malfunction of determination of collision is reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
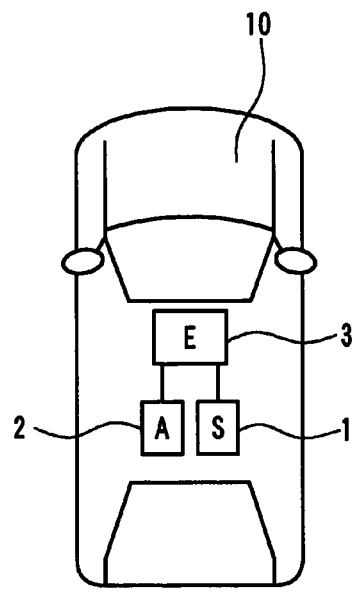
FIG. 1 is a diagram showing a passenger protection system according to an example embodiment.

FIG. 1 shows a passenger protection system mounted on a vehicle 10. The system detects collision of the vehicle 10 with an object. Based on detection result of the collision, the system functions to protect a passenger of the vehicle 10 from the collision.

Specifically, the system includes a sensor 1, an air bag 2 as one of examples of passenger protection devices, and an air bag ECU 3.

The sensor 1 detects impact of the collision when the vehicle 10 collides with the object. The sensor transmits digital data as a transmit data corresponding to a magnitude of the detected impact. The sensor 1 may be an acceleration sensor. The sensor 1 detects acceleration to be applied to the sensor 1, and the acceleration corresponds to the magnitude of the impact. When the acceleration detected by the sensor 1 is large, the impact of the collision is large.

The sensor 1 may detects the acceleration in a front direction of the vehicle 10. Alternatively, the sensor 1 may detect the acceleration in a left direction of the vehicle 10 when the sensor 1 is mounted on a right side of the vehicle 10. Alternatively, the sensor 1 may detect the acceleration in a right direction of the vehicle 10 when the sensor 1 is mounted on a left side of the vehicle 10.

When the air bag 2 receives an inflation signal from the air bag ECU 3, the air bag 2 inflates so that the air bag 2 catches the passenger, who sits down on a seat of the vehicle 10. Thus, the air bag 2 protects the passenger from the impact of the collision.

The air bag ECU 3 receives the transmit data from the sensor 1. Based on the received transmission data, the air bag ECU 3 determines whether it is necessary to protect the passenger from the collision. Specifically, the air bag ECU 3 determines whether the collision occurs so that it is necessary to protect the passenger. This determination is defined as collision determination. When the ECU 3 determines that the impact is applied to the vehicle 10, the impact requires protection of the passenger, the ECU 3 outputs an inflation signal as an activation signal to the air bag 2.

Figure 2:
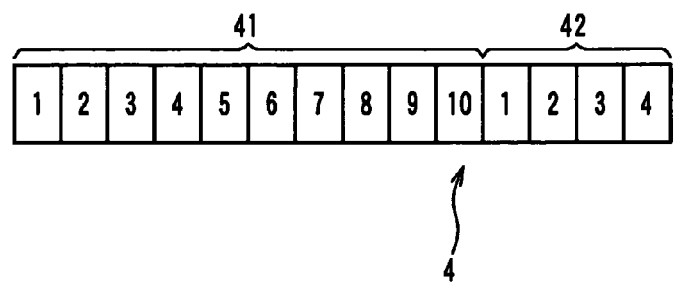
FIG. 2 is a diagram showing a transmit data of a sensor.

The transmit data 4 to be transmitted from the sensor 1 to the air bag ECU 3 will be explained with reference to FIG. 2. The data 4 is one data frame including a G data 41 as one of detection data and an expanded bit sequence 42. The G data 41 includes a digital data, which shows the acceleration detected by the sensor 1. The expanded bit sequence 42 includes a bit group having the same value as a part of the bit group in the digital data.

More specifically, the G data 41 is a 10-bit digital data, and the expanded bit sequence 42 is a 4-bit digital data. The 10-bit digital data in the G data 41 represents the acceleration detected by the sensor 1 so that the acceleration is shown in 10 bits. The expanded bit sequence 42 has the same value as the most significant 4-bit data (i.e., the highest order 4-bit data) in the G data 41.

Figure 3:
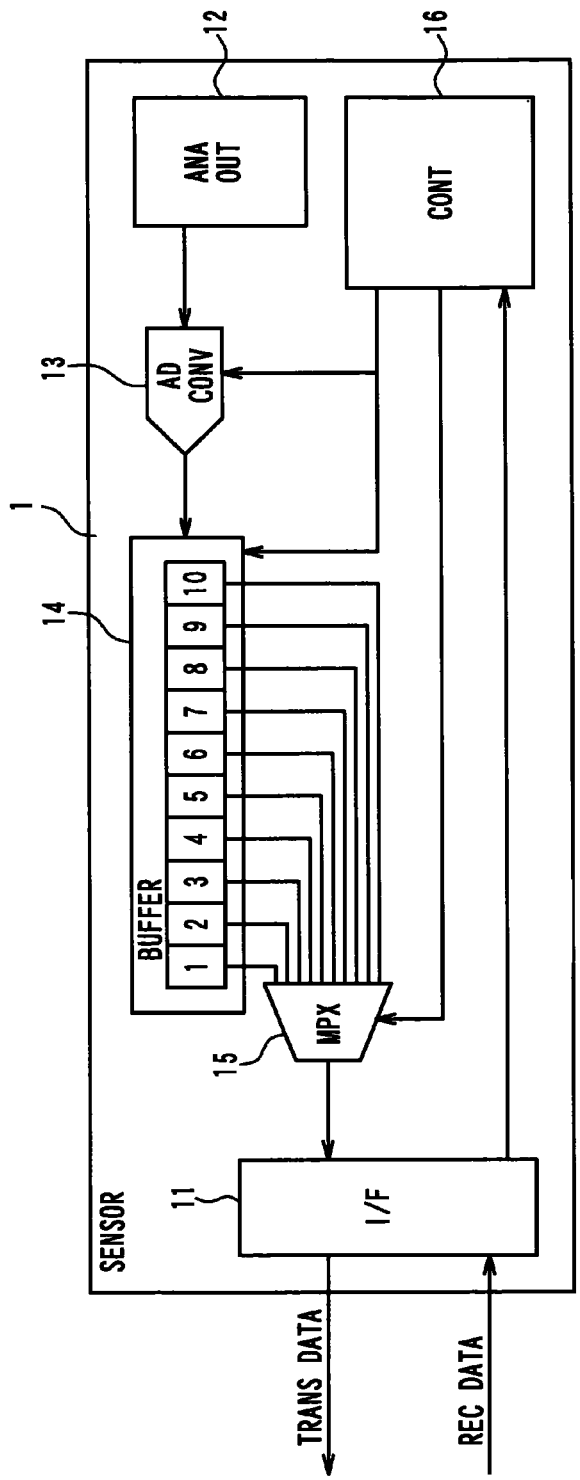
FIG. 3 is a diagram showing the sensor.

The sensor 1 for transmitting the transmit data 4 will be explained with reference to FIG. 3. The sensor 1 includes a transmitting/receiving interface (i.e., transmitting/receiving I/F) 11, an analog output element 12, an AD converter 13, a buffer element 14, a multi-plexer (MPX) 15 and a controller 16.

The interface 11 is an interface circuit for executing data communication with the air bag ECU 3. Specifically, the interface 11 converts the data output from the multi-plexer 15 with using a predetermined voltage level. Then, the interface 11 transmits the converted data as one batch of a data frame to the ECU 3. The interface 11 receives data from the ECU 3, and then, the interface 11 converts the data with using a predetermined voltage level. Further, the interface 11 outputs the converted data to the controller 16.

The analog output element 12 is a conventional circuit for detecting acceleration. The element 12 outputs an analog signal corresponding to the detected acceleration to the AD converter 13.

When the AD converter 13 receives a conversion instruction from the controller 16, the converter 13 converts the analog signal from the analog output element 12 into a 10-bit digital data. Then, the converter 13 outputs the 10-bit digital data as the converted data to the buffer element 14. Thus, the 10-bit digital data is the G data 41.

Figure 4:
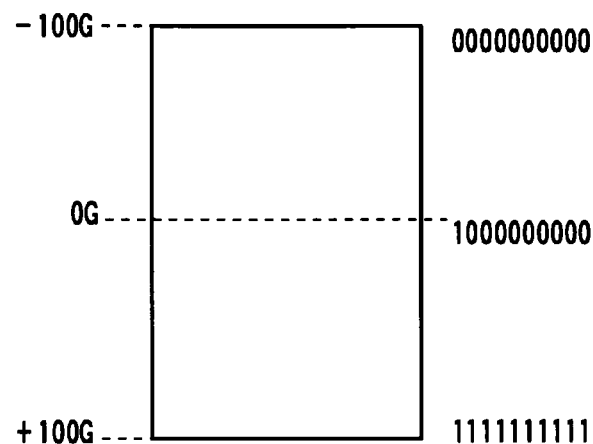
FIG. 4 is a diagram showing a A/D conversion process in a A/D converter.

The A/D conversion process in the A/D converter 13 will be explained with, reference to FIG. 4. For example, when the range of the acceleration to be output from the analog output element 12 is in a range between −100 G and +100 G, the converter 13 divides the range between −100 G and +100 G into multiple segments at regular intervals. The number of segments is $2^{10}-1=1023$. One end of one segment is defined as the number in a range between 0000000000 and 1111111111, which correspond to −100 G and +100 G, respectively. Specifically, ends of the segments are numbered in ascending order from 0000000000 to 1111111111, which are described in 10-bit binary number representation.

The converter 13 outputs one of 10-bit binary digits, which is the nearest value of the acceleration, to the buffer element 14. Thus, the converter 13 outputs the one 10-bit binary digit as the digital data for expressing the acceleration.

When the buffer element 14 having the memory medium receives a storing instruction from the controller 16, the buffer element 14 stores the 10-bit digital data (i.e., the one 10-bit binary digit) output from the converter 13 in a predetermined memory area of the memory medium.

The multi-plexer 15 reads out a value in certain bit of the 10-bit digital data in order, the certain bit is instructed by the controller 16. The multi-plexer 15 outputs the read value of the bit to the interface 11 in order. Specifically, the multi-plexer 15 forms a serial data, which consists of values of bits of the 10-bit digital data stored in the buffer element 14. The multi-plexer 15 outputs the formed serial data to the interface 11.

The controller 16 is a conventional microcomputer including a CPU, a RAM, a ROM and the like. The CPU executes a program stored in the ROM, so that the controller 16 performs various processes. Specifically, the controller 16 controls the converter 13, the buffer element 14 and the multi plexer 15 with appropriate timing according to a command received from the air bag ECU 3 via the interface 11.

Specifically, when the controller 16 receives a command for requiring the transmit data 4 from the ECU 3, the controller 16 waits for a predetermined transmit timing. When the predetermined transmit timing comes, the controller 16 outputs the conversion instruction to the converter 13. Then, the controller 16 outputs a storing instruction to the buffer element 14. Then, the converter 13 converts the analog acceleration value output from the analog output element 12 into the 10-bit digital data. Then, the buffer element 14 stores the 10-bit digital data in the predetermined memory area.

Further, the controller 16 outputs an instruction to the multi plexer 15, the instruction for outputting all of the values of 10 bits from the most significant bit (the highest order bit) to the least significant bit (the lowest order bit) in this order. Then, the controller 16 outputs an instruction for outputting a part of the values of the bits in descending order. Specifically the part of the values of the bits is the top four bit values so that the part of the bits is in a range between the most significant bit and the fourth most significant bit. Here, the part of the bits may be in a range between the most significant bit and a predetermined ordinal number most significant bit so that the instruction provides to output the part of the values of the bits in a range between the most significant bit and a predetermined ordinal number most significant bit in this order. Thus, the multi-plexer 15 outputs the serial data to the interface 11, the serial data comprising the first bit, the second bit, the third bit, the fourth bit, the fifth bit, the sixth bit, the seventh bit, the eighth bit, the ninth bit, the tenth bit, the first bit, the second bit, the third bit and the fourth bit, which are stored in the buffer element 14.

The interface 11 transmits the serial data as the transmit data 4 to the air bag ECU 3, the serial data being output from the multi-plexer 15. In the serial data, the first 10 bit data provide the G data 41, and the rest 4 bit data provide the expanded bit sequence 42.

Figure 5:
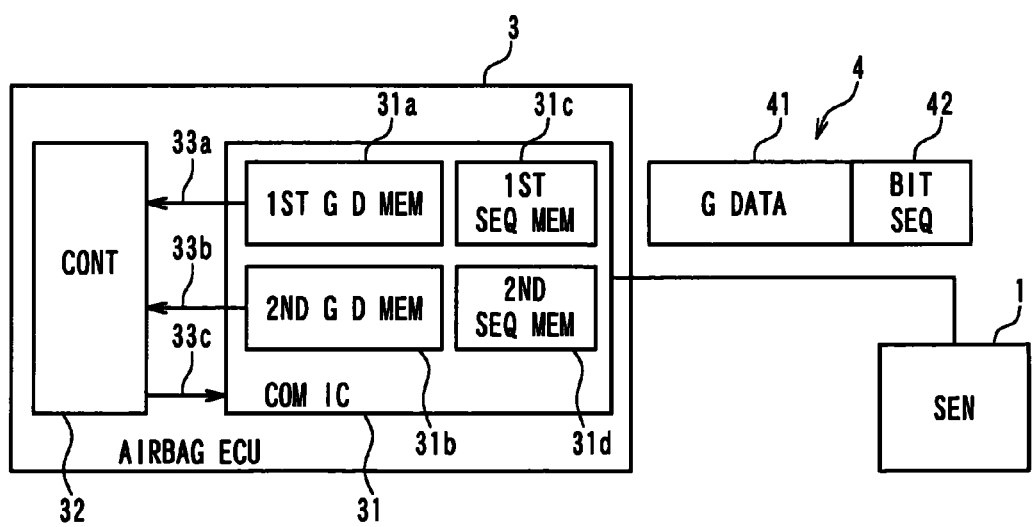
FIG. 5 is a diagram showing an air bag ECU.

Next, the process of the air bag ECU 3 for processing the transmit data 4 will be explained with reference to FIG. 5. The ECU 3 includes a communication IC 31 as a communication circuit and a control element 32. The communication IC 31 and the control element 32 are connected with at least three signal passages as a signal line 33a-33c.

The communication IC 31 is an interface circuit for performing data communication with the sensor 1. Specifically, when the communication IC 31 receives a command for the sensor 1 from the control element 32 via the third passage 33c, the command which requests the transmit data 4 and is output from the control element 32, the IC 31 converts the command signal with using a predetermined voltage level. Then, the IC 31 transmits the converted command signal to the sensor 1. Here, the third passage 33c is used for the command.

The IC 31 includes four memory mediums such as registers 31a-31d. When the IC 31 receives the transmit data 4 from the sensor 1, the IC 31 stores the G data 41 of the transmit data 4 in both of the first G data memory medium 31a (i.e., the first G data memory) and the second G data memory medium 31b (i.e., the second G data memory), and the IC 31 stores the expanded bit sequence 42 in both of the first expanded bit sequence memory medium 31c (the first bit sequence memory) and the second expanded bit sequence memory medium 31d (the second bit sequence memory).

When the communication IC 31 receives a data acquisition signal from the control element 32 via the third passage 33c, the IC 31 outputs the data in the first bit sequence memory 31c and the data in the first G data memory 31a to the control element 32 via the first passage 33a. Further, the IC 31 outputs the data in the second bit sequence memory 31d and the data in the second G data memory 31b to the control element 32 via the second passage 33b.

The control element 32 is a conventional microcomputer having a CPU, a RAM, a ROM and the like. The CPU executes a program stored in the ROM so that various processes are performed. Specifically, the control element 32 outputs the command for the sensor 1 to request the transmit data 4 to the communication IC 31 via the first passage 33a at predetermined intervals. Then, the control element 32 executes a process shown in FIG. 6.

Figure 6:
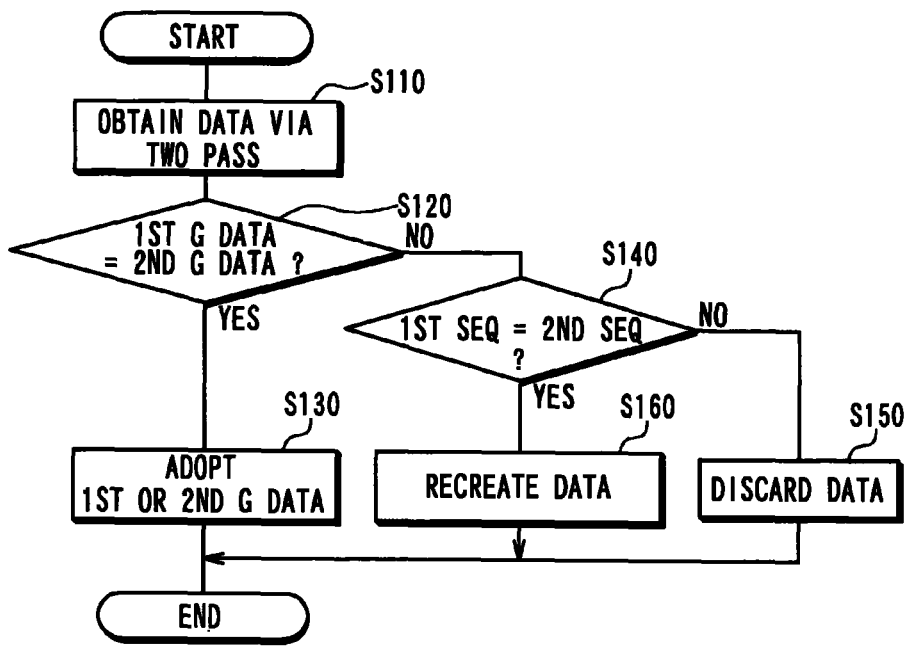
FIG. 6 is a flowchart showing a process executed by a CPU in the air bag ECU.
Figure 7:
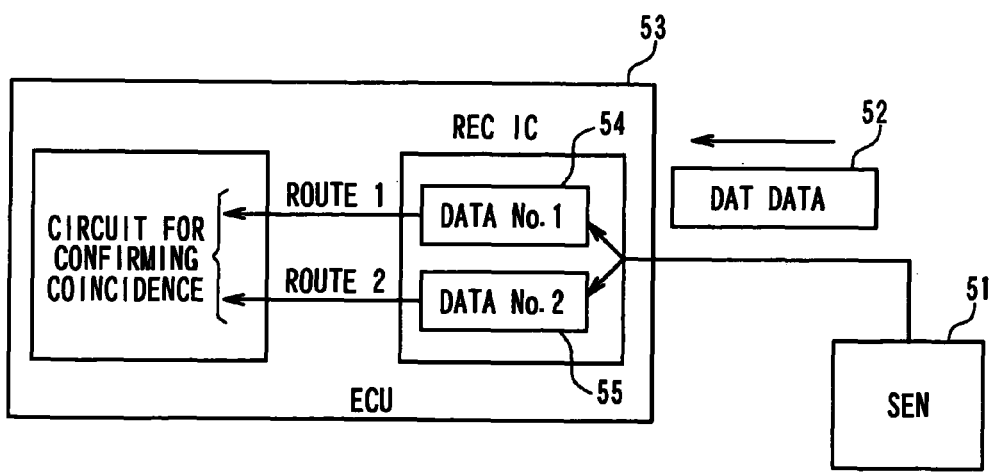
FIG. 7 is a diagram showing a passenger protection system as a comparison example.

In the process in FIG. 6, the control element 32 obtains the transmit data 4 via two passages 33a, 33b in step S110. Specifically, the control element 32 outputs the data acquisition signal to the communication IC 31 via the first passage 33a. After the control element 32 outputs the data acquisition signal, the control element 32 obtains the transmit data 4 stored in two different memories 31a-31d of the IC 31 via two passages 33a, 33b. The data 4 is transmitted from the sensor 1.

The G data 41 obtained from the first G data memory 31a via the first passage 33a is defined as the first G data 41, and the G data 41 obtained from the second G data memory 31b via the second passage 33b is defined as the second G data 41. The expanded bit sequence 42 obtained from the first bit sequence memory 31c via the first passage 33a is defined as the first expanded bit sequence 42, and the expanded bit sequence 42 obtained from the second bit sequence memory 31d via the second passage 33b is defined as the second expanded bit sequence 42.

In step S120, the control element 32 determines whether the first G data 41 is equal to the second G data. When the control element 32 determines that the first G data 41 is equal to the second G data, it goes to step S130. When the control element 32 determines that the first G data 41 is not equal to the second G data, it goes to step S140.

When the first G data is different from the second G data, bit fixation may occur at the first G data memory 31a and the first passage 33a, and/or bit fixation may occur at the second G data memory 31b and the second passage 33b since the first G data and the second G data are derived from the same original G data and stored in different two memories 31a, 31b. The bit fixation is phenomenon such that a specific bit data of data stored in or output from a device is fixed to a specific value because of some sort of cause. In this case, the specific bit data in the data output from the control element 32 becomes constant at any time.

In step S130, the acceleration provided by the first G data or the second G data is used as the detected acceleration of the sensor 1. Then, the sensor 1 determines whether the detected acceleration is equal to or larger than a predetermined threshold. When the sensor 1 determines that the detected acceleration is equal to or larger than a predetermined threshold, the sensor 1 determines that collision occurs so that it is necessary to protect the passenger from the collision. In this case, the sensor 1 outputs the activation signal to the air bag 2. After that, the process in FIG. 6 ends. When the sensor 1 determines that the detected acceleration is smaller than the predetermined threshold, the process in FIG. 6 ends.

In step S140, the control element 32 determines whether the first expanded bit sequence 42 is equal to the second expanded bit sequence 42. When the control element 32 determines that the first expanded bit sequence 42 is equal to the second expanded bit sequence 42, it goes to step S160. When the control element 32 determines that the first expanded bit sequence 42 is not equal to the second expanded bit sequence 42, it goes to step S150.

In step S150, the control element 32 discards the data. Specifically, the element 32 completes the process in FIG. 6 without performing collision determination with using the first and/or second G data. In this case, since the first G data is different from the second G data, and, in addition, the first expanded bit sequence is different from the second expanded bit sequence, reliability of the data is very low, and therefore, the data cannot be used for collision determination.

In step S160, the element 32 recreates the first or second G data with using the first or second expanded bit sequence. For example, when the second G data is recreated with using the first expanded bit sequence, a part of the bit data of the second G data that is also provided by the expanded bit sequence 42 is replaced with the first expanded bit sequence. In the present embodiment, the highest order bit data, and the second to fourth highest order bit data in the second G data are replaced with the first expanded bit sequence data.

This is because the reliability of the first and second expanded bit sequences is higher than the reliability of the first to fourth highest order but data in the first and second G data since the first expanded bit sequence is equal to the second expanded bit sequence.

In step S160, the acceleration provided by the recreated G data is used for the detected acceleration of the sensor 1. The recreated G data is prepared by the element 32 after replacement. In the above example, the recreated G data is prepared from the second G data. Then, the sensor 1 determines whether the detected acceleration is equal to or larger than a predetermined threshold. When the sensor 1 determines that the detected acceleration is equal to or larger than a predetermined threshold, the sensor 1 determines that collision occurs so that it is necessary to protect the passenger from the collision. In this case, the sensor 1 outputs the activation signal to the air bag 2. After that, the process in FIG. 6 ends. When the sensor 1 determines that the detected acceleration is smaller than the predetermined threshold, the process in FIG. 6 ends.

Thus, the collision determination in step S160 with using the recreated G data since at least the reliability of replaced bit data in the recreated G data is high. Since the replaced bit data is the predetermined number of high bit data, i.e., the first to fourth highest bit data, the replaced bit data affects on the collision determination result largely, compared with other bit data. Actually, the other bit data other than the predetermined number of high bit data may affect merely on consumption of current and/or radiation noise. Accordingly, when the recreated G data is used, the collision determination is performed with using the G data, which has high reliability in a part of the G data that affects largely on the collision determination result.

The above predetermined threshold, which is used for determination of occurrence of the collision that requires protection of the passenger of the vehicle, may be defined as a 10-bit data such that bit data other than the first to fourth highest order bit data is zero. For example, the 10-bit data of the threshold may be one of "1111000000," "1101000000," "1001000000," "0101000000," and "1110000000." In this case, the threshold has the same data structure as the G data 41, i.e., the threshold is defined as the 10-bit data, and the G data 41 is also defined as the 10-bit data.

Thus, in step S160, only the replaced part of the G data, which is replaced with the expanded bit sequence, affects on the collision determination result. And, the other part of the G data does not completely affect on the collision determination result. Thus, determination accuracy is much improved.

In the passenger protection system, the G data 41 defined as 10-bit data for showing the detected acceleration in the sensor 1 together with the expanded bit sequence 42 composed of the first to fourth highest order bit data are transmitted as one data frame.

The ECU 3 stores the received G data in two different memories 31a, 31b such that the first G data and the second G data are respectively stored in the memories 31a, 31b. Specifically, the ECU 3 stores the G data doubly. Further, the ECU 3 stores the received expanded bit sequence 42 in two different memories 31c, 31d such that the first expanded bit sequence and the second expanded bit sequence are respectively stored in the memories 31c, 31d. Specifically, the ECU 3 stores the expanded bit sequence doubly.

The control element 32 in the ECU 3 obtains the first and second G data via two different passages 33a, 33b, respectively. Further, the control element 32 in the ECU 3 obtains the first and second expanded bit sequences via two different passages 33a, 33b, respectively.

When the first G data is equal to the second G data, i.e., when the determination in step S120 is "YES," the collision determination step is performed with using the first or second G data, i.e., the first or second G data is compared with the threshold. When the first G data is different from the second G data, i.e., when the determination in step S120 is "NO," the element 32 compares the first expanded bit sequence with the second expanded bit sequence. When the first expanded bit sequence is different from the second expanded bit sequence, the first and second G data is not used for the collision determination step. When the first expanded bit sequence is equal to the second expanded bit sequence, the first to fourth highest order bit data in the first or second G data is replaced with the first or second expanded bit sequence. Then, the replaced first or second G data is compared with the threshold. Here, the first to fourth highest order bit data correspond to the most significant bit data group.

Thus, even if the first G data is partially different from the second G data, when the first expanded bit sequence is equal to the second expanded bit sequence, the G data is modified with using one of the first and second expanded bit sequences. The first and second expanded bit sequences are in the most important bit group for collision determination. Then, the modified G data is used for collision determination. Thus, even if the first G data is partially different from the second G data, the collision determination is performed without stopping collision determination with using the first and second G data after the most important bit grouping the G data, which largely affects on the collision determination result, is replaced with the expanded bit sequence. In this case, the expanded bit sequence is high reliable data. Thus, the detection of collision is performed sufficiently. The system reduces the possibility of failure of determination. Further, function of the passenger protection system for detecting collision to protect the passenger is not reduced.

In the above embodiment, it is not necessary to transmit the transmit data 4 again from the sensor 1. Specifically, the sensor 1 transmits the same transmit data 4 only once. Since the sensor 1 does not transmit the same data 4 again, transmission control of the sensor 1 is simplified. Specifically, it is not necessary to add a resend bit data in the transmit data 4. Further, it is not necessary to add a register for storing the resend bit in order to control a resending step.

Other Embodiments

In the above embodiment, the analog acceleration value output from the analog output element 12 in a range between −100 G and +100 G is converted to the G data 41 provided by the 10-bit data in a range between "0000000000" and "1111111111." Alternatively, the analog acceleration value may be converted in a different manner.

For example, the value may be converted to a 10-bit binary number representation such that −100 G corresponds to 1111111111, and +100 G corresponds to 0000000000, and the value is associated with the 10-bit binary number representation in descending order. In this case, a part of bits that affects largely on the collision determination is the high bit data. Thus, the expanded bit sequence 42 includes a predetermined number of high bit data in a range between the highest bit data and a predetermined ordinal number highest bit.

In some cases where the analog acceleration value is converted to the digital data in a different manner from the above case, the part of bits that affects largely on the collision determination may not be the high bit data.

For example, the analog acceleration value is converted to a 10-bit data in a range between "0000000000" and "1111111111," and after that, the 10-bit data is stored in the buffer element 11. The multi-plexer 15 retrieves the 10-bit data in an order from the lowest bit data to the highest bit data, and the multi-plexer 15 outputs the retrieved data as the serial data to the interface 11. In this case, a part of bits that affects largely on the collision determination is the low bit data. Specifically, the part of the serial data that affects largely on the collision determination is the first to fourth lowest bit data.

In the present embodiment, a part of the bits that affects largely on collision determination is a bit sequence including multiple bit data, which are defined such that the analog acceleration value is largely changed when one of the multiple bit data is changed from "1" to "0," or changed from "0" to "1."

For example, the difference of the corresponding analog acceleration value between a case where the highest order bit data is "1" and a case where the highest order bit data is "0" is calculated as 200 G/1023×512≈100 G, and thus, the difference is 100 G. The difference of the corresponding analog acceleration value between a case where the lowest order bit data is "1" and a case where the lowest order bit data is "0" is calculated as 200 G/1023≈0.20 G, and thus, the difference is 0.20 G.

When the highest bit data in the G data may represent a sign bit showing a positive or negative in the analog acceleration value. In this case, the difference of the corresponding analog acceleration value between a case where the highest order bit data is "1" and a case where the highest order bit data is "0" is 200 G at a maximum. Thus, the corresponding analog acceleration value is changed by 200 G.

In view of the above point, in the present embodiment, even when the analog acceleration value is converted to the G data as a digital data in a different manner, the most important bit group is defined such that the corresponding analog acceleration value is largely changed when the bit data of the most important bit group is changed from "1" to "0," or from "0" to "1." The expanded bit sequence 42 includes at least the most important bit group.

The control element 32 in the air bag ECU 3 may store information in the ROM preliminary, the information about the bit data larger than the threshold and the bit data smaller than the threshold in accordance with a conversion method of the analog acceleration value to the G data. In steps S130, S160, based on the information, the G data and the threshold may be compared.

As long as the sensor 1 outputs the digital data corresponding to the amount of magnitude of impact of the collision, the sensor 1 may be another sensor such as a pressure sensor and a displacement sensor. For example, the pressure sensor detects pressure to be applied to a body of the vehicle corresponding to the magnitude of the impact of collision. The displacement sensor detects a displacement of a body of the vehicle corresponding to the magnitude of the impact of collision. When the pressure and the displacement are large, the magnitude of impact of collision is large.

The expanded bit sequence 42 may be different from a 4-bit data. Alternatively, the G data 41 may be different from a 10-bit data.

The passenger protection device may be different from the air bag 2. For example, the passenger protection device for protecting the passenger from the impact of collision may be a seat belt pre-tensioner or the like.

The G data 41 and the expanded bit sequence 42 are transmitted as one batch data packet so that the G data 41 and the expanded bit sequence 42 are disposed in the same frame. Alternatively, the G data 41 and the expanded bit sequence 42 may be included in different frames, respectively. In this case, the G data 41 and the expanded bit sequence 42 are transmitted as separated data packets.

The first expanded bit sequence 31c is output to the control element 32 via the first passage 33a, which is the same as the first G data 31a. Alternatively, the first expanded bit sequence 31c may be output to the control element 32 via a passage (a signal line), which is different from the first passage 33a of the first G data 31a and the second passage 33b of the second G data 31b and the second expanded bit sequence 31d. The second expanded bit sequence 31d is output to the control element 32 via the second passage 33b, which is the same as the second G data 31b. Alternatively, the second expanded bit sequence 31d may be output to the control element 32 via a passage (a signal line), which is different from the first passage 33a of the first G data 31a and the first expanded bit sequence 31c and the second passage 33b of the second G data 31b.

The threshold for determining collision in step S130 may be different from the threshold for determining collision in step S160. Alternatively, the threshold for determining collision in step S130 may be equal to the threshold for determining collision in step S160.

The first and second G data and the first and second expanded bit sequences may be stored in the same memory medium of the air bag ECU 3 such that they are stored in different area of the same memory medium.

In the above embodiment, when the first detection data as the first G data is different from the second detection data as the second G data, the first bit sequence as the first expanded bit sequence is compared with the second bit sequence as the second expanded bit sequence. When the first bit sequence is equal to the second bit sequence, the most important bit group in the first or the second detection data is replaced with the first or second bit sequence. Based on comparison result between the replaced detection data and the threshold, the ECU 3 determines whether collision that requires passenger protection occurs.

A method for determining whether the collision occurs so that it is necessary to protect the passenger may be different from a case where the replaced detection data is compared with the threshold. For example, the replaced detection data may be integrated with time, and the integrated detection data is compared with the threshold. Based on comparison result between the integrated detection data and the threshold, the ECU 3 determines whether collision occurs so that it is necessary to protect the passenger. Alternatively, the replaced detection data may be filtered with a low pass filter, so that the filtered detection data is compared with the threshold.

Each process that is realized by performing a program with the controller 16 of the sensor 1 or the CPU 32 of the air bag ECU 3 may be realized by a hard ware such as a FPGA capable of programming a circuit function The above disclosure has the following aspects.

According to an aspect of the present disclosure, a passenger protection system for a vehicle includes: a sensor for detecting an impact of collision when the vehicle collides with an object and for outputting a detection digital data corresponding to a magnitude of the impact; a passenger protection device for protecting a passenger from the collision; and an electric control unit for determining based on the detection digital data whether it is necessary to protect the passenger from the collision and for activating the passenger protection device when the electric control unit determines that it is necessary to protect the passenger from the collision. The sensor outputs a bit sequence together with the detection digital data to the electric control unit. The bit sequence includes a plurality of bits, which provide an important bit group. The important bit group is defined in such a manner that difference of the magnitude of the impact between a case where one bit of the detection digital data is "1" and a case where the one bit of the detection digital data is "0" is equal to or larger than a predetermined value. The detection digital data includes a plurality of bits for providing the important bit group. The electric control unit includes a memory. The memory stores the detection digital data doubly so that a first detection digital data and a second detection digital data are stored in the memory. The memory stores the bit sequence doubly so that a first bit sequence and a second bit sequence are stored in the memory. The electric control unit determines based on the first or second detection digital data whether it is necessary to protect the passenger from the collision when the first detection digital data is equal to the second detection digital data. When the first detection digital data is different from the second detection digital data, the electric control unit compares the first bit sequence with the second bit sequence. When the first detection digital data is different from the second detection digital data, and the first bit sequence is different from the second bit sequence, the electric control unit does not determine whether it is necessary to protect the passenger from the collision. When the first detection digital data is different from the second detection digital data, and the first bit sequence is equal to the second bit sequence, the electric control unit replaces the important bit group in the first or second detection digital data with the first or second bit sequence, and the electric control unit determines based on the first or second detection digital data after replacement whether it is necessary to protect the passenger from the collision.

In the above system, even if the first detection data is different from the second detection data, the system determines with using the modified first or second detection data whether it is necessary to protect the passenger from the collision. Thus; the system surely detects collision in order to protect a passenger from the collision. Further, possibility of malfunction of determination of collision is reduced.

Alternatively, when the first detection digital data is different from the second detection digital data, and the first bit sequence is equal to the second bit sequence, the electric control unit may compare the first or second detection digital data after replacement with a predetermined threshold digital data. The electric control unit determines that it is necessary to protect the passenger from the collision when the first or second detection digital data after replacement is equal to or larger than the predetermined threshold digital data. All of bit values in the predetermined threshold digital data other than the important bit group are "0." In this case, detection accuracy is improved.

Alternatively, the memory may include a first detection digital data memory, a second detection digital data memory, a first bit sequence memory and a second bit sequence memory. The memory stores the detection digital data doubly in such a manner that the first detection digital data is stored in the first detection digital data memory, and the second detection digital data is stored in the second detection digital data memory. The memory stores the bit sequence doubly in such a manner that the first bit sequence is stored in the first bit sequence memory, and the second bit sequence is stored in the second bit sequence memory. The electric control unit retrieves the first detection digital data from the first detection digital data memory via a first data passage, and the electric control unit retrieves the second detection digital data from the second detection digital data memory via a second data passage when the electric control unit compares the first detection digital data with the second detection digital data. The electric control unit retrieves the first bit sequence from the first bit sequence memory via the first data passage, and the electric control unit retrieves the second bit sequence from the second bit sequence memory via the second data passage when the electric control unit compares the first bit sequence with the second bit sequence.

Further, the sensor may output the bit sequence together with the detection digital data as one data frame. The detection digital data is a 10-bit data, and the bit sequence is a 4-bit data.

Furthermore, the sensor may be an acceleration sensor, a pressure sensor or a displacement sensor, and the passenger protection device may be an air bag device or a seat belt pretensioner.

Further, when the first detection digital data is different from the second detection digital data, and the first bit sequence is equal to the second bit sequence, the electric control unit may compare the first or second detection digital data after replacement with a predetermined threshold digital data. The electric control unit determines that it is necessary to protect the passenger from the collision when the first or second detection digital data after replacement is equal to or larger than the predetermined threshold digital data. All of bit values in the predetermined threshold digital data other than the important bit group are "0."

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:
1. A passenger protection system for a vehicle comprising:
   a sensor for detecting an impact of collision when the vehicle collides with an object and for outputting a detection digital data corresponding to a magnitude of the impact;
   a passenger protection device for protecting a passenger from the collision; and
   an electric control unit for determining based on the detection digital data whether it is necessary to protect the passenger from the collision and for activating the passenger protection device when the electric control unit determines that it is necessary to protect the passenger from the collision,
   wherein the sensor outputs a bit sequence together with the detection digital data to the electric control unit,
   wherein the bit sequence includes a plurality of bits, which provide an important bit group,
   wherein the important bit group is defined in such a manner that difference of the magnitude of the impact between an instance of impact where one bit of the detection digital data is "1" and another instance of impact where the one bit of the detection digital data is "0" is equal to or larger than a predetermined value,
   wherein the detection digital data includes the plurality of bits for providing the important bit group,
   wherein the electric control unit includes a memory,
   wherein the memory stores the detection digital data doubly so that a first detection digital data and a second detection digital data are stored in the memory,
   wherein the memory stores the bit sequence doubly so that a first bit sequence and a second bit sequence are stored in the memory,
   wherein the electric control unit determines based on the first or second detection digital data whether it is necessary to protect the passenger from the collision when the first detection digital data is equal to the second detection digital data,
   wherein, when the first detection digital data is different from the second detection digital data, the electric control unit compares the first bit sequence with the second bit sequence, wherein, when the first detection digital data is different from the second detection digital data, and the first bit sequence is different from the second bit sequence, the electric control unit does not determine whether it is necessary to protect the passenger from the collision, and wherein, when the first detection digital data is different from the second detection digital data, and the first bit sequence is equal to the second bit sequence, the electric control unit replaces the important bit group in the first or second detection digital data with the first or second bit sequence, and the electric control unit determines based on the first or second detection digital data after replacement whether it is necessary to protect the passenger from the collision.

2. The passenger protection system according to claim 1, wherein, when the first detection digital data is different from the second detection digital data, and the first bit sequence is equal to the second bit sequence, the electric control unit compares the first or second detection digital data after replacement with a predetermined threshold digital data, the predetermined threshold digital data including the important bit group, wherein the electric control unit determines that it is necessary to protect the passenger from the collision when the first or second detection digital data after replacement is equal to or larger than the predetermined threshold digital data, and wherein all of bit values in the predetermined threshold digital data other than the important bit group are "0".

3. The passenger protection system according to claim 1, wherein the memory includes a first detection digital data memory, a second detection digital data memory, a first bit sequence memory and a second bit sequence memory, wherein the memory stores the detection digital data doubly in such a manner that the first detection digital data is stored in the first detection digital data memory, and the second detection digital data is stored in the second detection digital data memory, wherein the memory stores the bit sequence doubly in such a manner that the first bit sequence is stored in the first bit sequence memory, and the second bit sequence is stored in the second bit sequence memory, wherein the electric control unit retrieves the first detection digital data from the first detection digital data memory via a first data passage, and the electric control unit retrieves the second detection digital data from the second detection digital data memory via a second data passage when the electric control unit compares the first detection digital data with the second detection digital data, and wherein the electric control unit retrieves the first bit sequence from the first bit sequence memory via the first data passage, and the electric control unit retrieves the second bit sequence from the second bit sequence memory via the second data passage when the electric control unit compares the first bit sequence with the second bit sequence.

4. The passenger protection system according to claim 3, wherein the sensor outputs the bit sequence together with the detection digital data as one data frame, wherein the detection digital data is a 10-bit data, and wherein the bit sequence is a 4-bit data.

5. The passenger protection system according to claim 4, wherein the sensor is an acceleration sensor, a pressure sensor or a displacement sensor, and wherein the passenger protection device is an air bag device or a seat belt pretensioner.

6. The passenger protection system according to claim 5, wherein, when the first detection digital data is different from the second detection digital data, and the first bit sequence is equal to the second bit sequence, the electric control unit compares the first or second detection digital data after replacement with a predetermined threshold digital data, the predetermined threshold digital data including the important bit group, wherein the electric control unit determines that it is necessary to protect the passenger from the collision when the first or second detection digital data after replacement is equal to or larger than the predetermined threshold digital data, and wherein all of bit values in the predetermined threshold digital data other than the important bit group are "0".

* * * * *